United States Patent [19]
Struyk

[11] Patent Number: 5,597,952
[45] Date of Patent: Jan. 28, 1997

[54] SPEED MEASURING AND COMPENSATION APPARATUS FOR JET-PROPELLED WATERCRAFT

[75] Inventor: David A. Struyk, Excelsior, Minn.

[73] Assignee: Waterstrike Incorporated, Minn.

[21] Appl. No.: 316,553

[22] Filed: Sep. 30, 1994

[51] Int. Cl.$^6$ .............. G01F 13/00; G01F 1/46; G01P 5/00
[52] U.S. Cl. .................. 73/170.14; 73/861.65
[58] Field of Search .............. 73/170.11, 170.14, 73/181, 182, 184, 861.65

[56] References Cited

U.S. PATENT DOCUMENTS

| | | | |
|---|---|---|---|
| D. 329,039 | 9/1992 | Struyk. | |
| 2,709,979 | 6/1955 | Bush et al. | 73/861.65 |
| 3,083,568 | 4/1963 | Söredal | 73/861.65 |
| 3,349,615 | 10/1967 | Finkl | 73/861.65 |
| 3,355,946 | 12/1967 | Lazell | 73/861.65 |
| 3,705,534 | 12/1972 | Turek | 73/170.14 |
| 4,205,552 | 6/1980 | Refoy | 73/182 |

FOREIGN PATENT DOCUMENTS

2270587  12/1975  France.

*Primary Examiner*—Richard Chilcot
*Assistant Examiner*—William L. Oen
*Attorney, Agent, or Firm*—Schroeder & Siegfried, P.A.

[57] ABSTRACT

A speed measuring system for a jet-propelled watercraft which includes a pitot tube mounted within the jet intake chamber of the watercraft for measuring the dynamic water pressure therewithin. The pitot tube is linked via flexible tubing to a pressure port in the dashboard of the watercraft, which is fitted with an electronic pressure sensor. The output of the electronic pressure sensor is amplified and input to an analog-to-digital converter, where the digital data is then input to a microprocessor for calculation of the actual water speed as a function of the dynamic water pressure measured within the jet intake chamber of the watercraft. A variable linear scaling factor is applied to the digital pressure signal over different ranges of such signals to compensate for nonlinearities that are introduced in the dynamic water pressure within the intake chamber. Further adjustment of the digital pressure signal is made to account for static pressure variances caused by changes in altitude, barometric pressure, and the depth of the pitot tube sensor under the surface of the water. Pressure signal drop-outs caused when the jet intake opening breaks contact with the water are identified through signal processing and replaced with a substitute signal that is determined through a process of interpolation of prior pressure signals, to eliminate wide fluctuations in watercraft speed measurement.

21 Claims, 5 Drawing Sheets

SPEED MEASURING AND COMPENSATION APPARATUS FOR JET-PROPELLED WATERCRAFT

BACKGROUND OF THE INVENTION

My invention disclosed and claimed herein relates generally to the art of measuring the speed of a jet-propelled watercraft, and more particularly to a speed measuring system capable of determining the speed of a jet-propelled watercraft as a function of the dynamic water pressure produced within the jet intake chamber of such a watercraft.

Traditionally, mechanical speedometers for watercrafts have employed a pitot tube which is mounted to the transom of the boat and linked via a flexible tube to a pressure gauge which is marked with speed graduations for the operator's view. Electronic speedometers, on the other hand, have generally employed a rotating paddle wheel which is electrically linked to an electronic display for the operator's viewing. While the above traditional speedometers have been found useful in measuring the speed of larger watercrafts, their use has not been considered acceptable in connection with smaller personal jet-propelled watercrafts, such as those commonly known as the Jet Ski and Wave Runner.

Because a small personal watercraft is most often boarded from the water, it is specifically designed to utilize a jet drive so as to eliminate the safety hazard of an exposed propeller. In such a personal watercraft, an impeller shaft carrying an impeller extends into a protected jet intake chamber, through which water is drawn for propulsion of the watercraft. Thus, the operator of the watercraft is shielded from the impeller.

Use of a pitot tube in connection with a personal watercraft also raises significant safety concerns. A traditional pitot tube, which is generally mounted exteriorly to the transom of a boat, will oftentimes resemble a fin or dagger which, if mounted to a personal watercraft, poses a significant safety concern for the operator while boarding the watercraft. Additionally, externally exposed pitot tubes are subject to breakage, as personal watercrafts are oftentimes driven or pulled entirely onto a beach where damage to an exposed pitot tube may occur. Traditional paddle wheels, while somewhat safer, are also unreliable, become clogged with dirt, and are subject to breakage when exposed to such conditions.

Theoretically, on jet-propelled watercrafts, the above safety and durability concerns could be alleviated by providing a pitot tube which is not externally exposed. However, as a practical matter, this is a difficult task, since the pitot tube must extend into the water through which the watercraft is traveling, in order to obtain a true water pressure reading for conversion to speed. Moreover, any obstruction tending to interfere with the clean flow of the water will affect and alter the true water pressure, thereby causing significant errors in the calculation of the true watercraft speed.

For the above reasons, mounting a pitot tube within the jet intake chamber of a jet-propelled watercraft has not heretofore been considered, since it is known that the water pressure within the intake chamber varies significantly from that of the water within which the watercraft travels. The speed of the water through the jet intake chamber is accelerated and heavily non-linear in comparison with the actual speed at which the watercraft is moving. Consequently, the water pressure within the jet intake chamber is also heavily non-linear in comparison to that outside the chamber. Moreover, water which is drawn through the jet intake chamber is highly turbulent, and the physical geometry of the jet intake chamber will mask or shadow the pitot fin, thereby introducing additional non-linearities which seriously affect the speed readings. Additionally, due to the surface proximity of the intake chamber at planing speeds for a personal watercraft, a jet intake mounted pitot fin will often break contact with the water (commonly referred to as "drop-out"), thereby leading to inaccurate and erratic speed readings.

With the advent of the personal watercraft, however, the above safety and durability concerns have become increasingly important, and there has developed a distinct need for a means by which the speed of a jet-propelled watercraft may be accurately determined, while also satisfying the above concerns for safety and durability. By mounting the pitot tube within the jet intake chamber of a jet propelled watercraft, the operator will be protected from unsafe operating conditions, and conditions upon which the pitot tube and speed measuring system can become easily damaged. It is with this objective in mind, that I have developed a speed measuring system hereinafter described and claimed for a jet-propelled watercraft.

BRIEF SUMMARY OF THE INVENTION

With the objective to eliminate the enhanced safety and durability concerns associated with the smaller personal watercrafts, I have developed an electronic speed measuring system which utilizes a jet intake mounted pressure sensor, and a microprocessor that applies digital signal processing and linearizing techniques to pressure signals received from within the jet intake chamber to compensate for the extreme non-linear conditions of the dynamic water pressure therewithin. By so doing, dynamic water pressure signals from within the jet intake chamber may be accurately converted to readings of true or actual speed of the personal watercraft, with complete durability and safety to the operator. As used herein, and in the appended claims, the terms "true speed" and "actual speed" mean the speed at which the jet-propelled watercraft is moving relative to the body of water within which the watercraft is being operated.

The jet intake mounted pressure sensor of my speed measuring system includes a relatively small fin-shaped pitot tube mounted within the jet intake chamber adjacent to the intake opening, just above the intake grate which extends thereover. The pitot tube is mounted below the impeller drive shaft and forward of the impeller such that it protrudes outwardly into the jet intake chamber in substantially clean flowing relation to the water being drawn through the intake opening. Whenever the phrase "clean flowing" is used herein or throughout the appended claims, it is intended to mean that the pitot tube is positioned to extend into a minimally obstructed, more laminar flow region of the water within the jet intake chamber.

The pitot tube is connected via flexible tubing to a pressure port which is fitted with an electronic pressure sensing device. The pressure sensing device produces an analog output pressure signal representative of the dynamic water pressure present within the jet intake chamber. The analog pressure signals produced by the pressure sensing device are amplified and input to an analog-to-digital converter, which converts the pressure signals to a digital pulsetrain, the frequency of which fluctuates proportionately with increases and decreases in the amplitude of the pressure signals received from the electronic pressure sensing device.

Such digital data is thereafter input to a microprocessor where it is continually sampled and subjected to digital signal processing and linearizing functions to compensate for non-linear variances introduced in the dynamic water pressure within the jet intake chamber due to the accelerated turbulent water flow therethrough, and the geometry of the jet intake chamber itself. An accurate approximation of the actual or true speed of the watercraft is then calculated as a function of a scaled or compensated dynamic water pressure within the jet intake chamber.

Under operation, water is drawn through the jet intake chamber by the jet drive, thereby flowing past the pitot tube. As water moves past the pitot tube, a dynamic ram pressure is developed in the orifice of the pitot tube, which imparts a static pressure in the flexible tubing leading to the pressure port. This pressure is converted by the electronic pressure sensing device to an analog signal which is digitally converted and input to the microprocessor.

The microprocessor samples such digital data and utilizes a variable piecewise linear scaling algorithm to adjust the substantially non-linear pressure signal generated within the jet intake chamber of the watercraft, such that a close approximation of the true speed of the watercraft may be calculated through application of Bernoulli's equation relating pressure to flow velocity of a liquid. As the dynamic water pressure within the jet intake chamber increases, it passes through a number of predefined ranges of pressure, wherein each range of pressure has an associated linear scaling factor which is applied to pressure signals that fall within such range. The linear scaling factor varies as necessary between predefined ranges of dynamic water pressure, such that the specific scaling factor associated with each range of pressure compensates for the non-linear effects introduced by the turbulent water flow through the jet intake chamber.

My improved speed measuring system for jet-propelled watercrafts incorporates an auto zero tracking system which applies a variable offset to the pressure signal generated from within the jet intake chamber to account for both additional pressure as a result of the position (depth) of the pitot tube in the water and bias offsets of the pressure sensing device resulting from temperature changes and atmospheric pressure. The auto zero tracking function monitors the engine of the watercraft for a "start-up" event, or a "power-down" event. Upon the occurrence of either, the auto zeroing function samples the inputted pressure signal and establishes a "zero" pressure signal therefrom. The auto zeroing function then subtracts the "zero" pressure signal from pressure signals sensed within the jet intake chamber, thereby accounting for the additional residual pressures described above. Thus, at still conditions upon start-up and power-down of the watercraft, the speed measuring system will display a zero speed reading to the operator.

In addition to the above, during conditions where the speed measuring system has been turned on and the watercraft engine remains off, the auto zero tracking function will continue to track slow variances in the inputted pressure signal that are caused by changes in temperature, atmospheric conditions, and depth of the pitot tube within the water. Until the watercraft engine is turned on or the speed measuring system goes off, the auto zero tracking function will continue to update the "zero" pressure signal as necessary to accurately reflect the current existing conditions.

Also included in my new speed measuring system is a pressure drop-out tracking mechanism which continuously samples pressure signals generated by the electronic pressure sensing device, and detects drop-outs in the pressure readings caused when the watercraft, and consequently the jet intake mounted pitot tube, breaks contact with the water. The drop-out tracking mechanism detects and ignores pressure signal drop-outs by digitally treating such drop-outs as missing data. Through the use of signal processing, such pressure signal drop-outs are substituted with interpolated pressure signals comprising an average of previously sampled pressure signals which have been determined to be valid. Because of the sensitivity of my new speed measuring system, and the nature of personal watercrafts, it is necessary to account for such pressure signal drop-outs so as to avoid erratic speed readings from being displayed to the operator of the personal watercraft.

Through the use of my new speed measuring system for jet-propelled watercrafts, it has been found that the true speed at which such watercraft is traveling may be determined to within +/−0.5 miles per hour (mph) with a display resolution of 0.1 mph from 0 to 65 mph. This is accomplished while at the same time providing the necessary safety and durability required for use with smaller personal watercraft.

BRIEF DESCRIPTION OF THE DRAWINGS

These and other objects and advantages of the invention will more fully appear from the following description, made in connection with the accompanying drawings, wherein like reference characters refer to the same or similar parts throughout the several views, and in which.

DETAILED DESCRIPTION OF THE INVENTION

Figure 1:
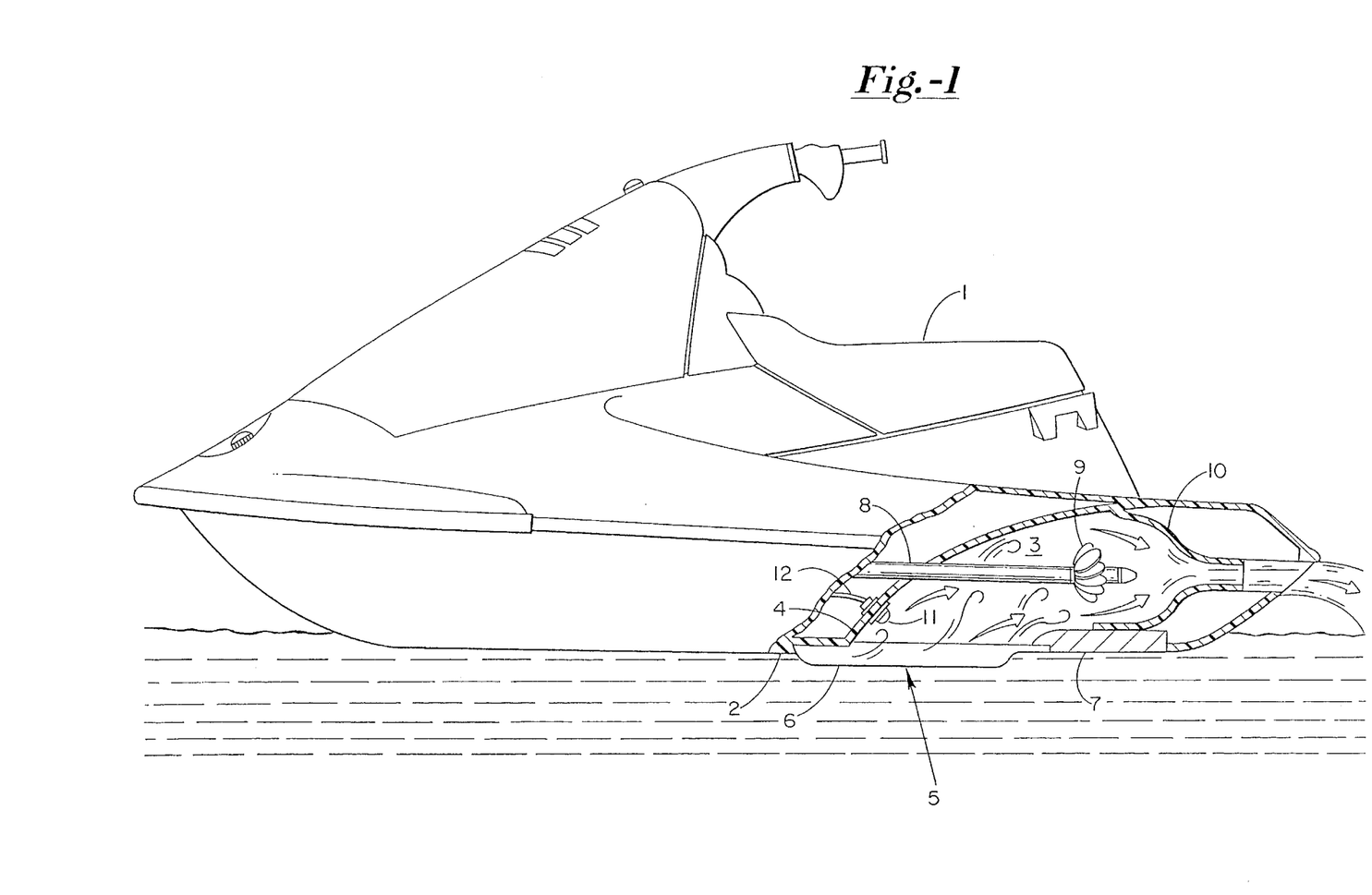
FIG. 1 is a perspective view of a jet-propelled personal watercraft device having a rear portion thereof broken away to disclose its jet intake chamber which incorporates an intake mounted pitot tube for use in connection with my new speed measuring system.

Shown in FIG. 1 is a personal watercraft 1 having a hull 2 which forms a jet intake chamber 3 adjacent the aft or rear end thereof. Hull 2 diverges inwardly to define a forward portion 4 of intake chamber 3, which is adjacent the intake opening 5 over which intake grate 6 is disposed. Intake grate 6 is secured between hull 2 and the rear ride plate 7 of the personal watercraft 1. Intake grate 6 is disposed over the intake opening 5 to prevent access within intake chamber 3 where impeller shaft 8 carrying impeller 9 is disposed. Extending from the rear of the jet intake chamber 3 of personal watercraft 1 is a jet nozzle 10 through which water that is drawn into intake chamber 3 is thrust outwardly to propel the personal watercraft.

Mounted on the forward wall 4 of jet intake chamber 3 is a relatively small fin-shaped pitot tube 11. Pitot tube 11 is disposed below impeller shaft 8 and forward of impeller 9, such that it protrudes outwardly into jet intake chamber 3 in clean flowing relation to the water drawn through intake opening 5.

Figure 2:
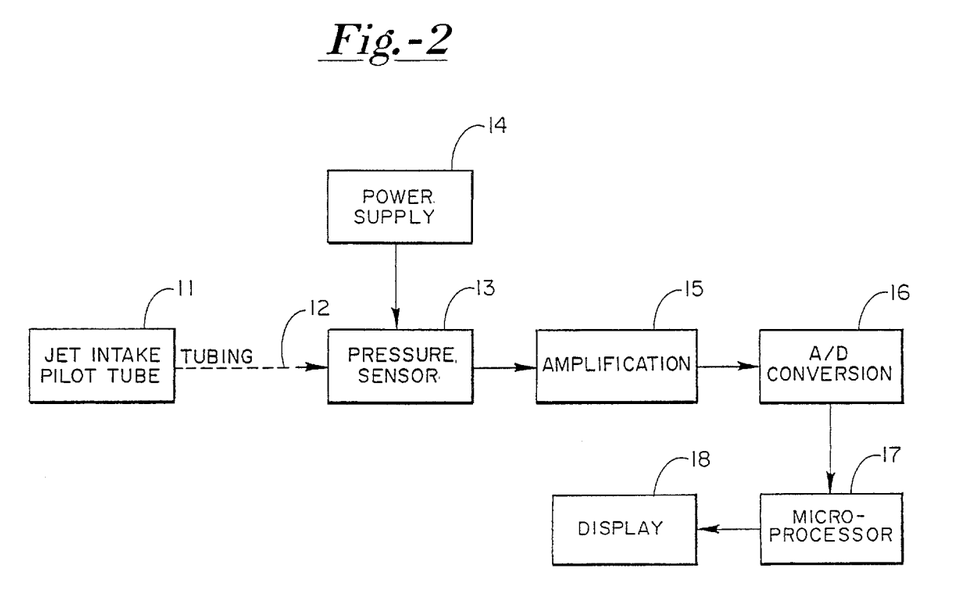
FIG. 2 shows a block diagram of my new speed measuring system for calculating the true speed of a jet-propelled watercraft.

Connected to pitot tube 11 is a flexible tubing 12 which extends therefrom to a pressure port (not shown) that is fitted with an electronic pressure sensor 13 (see FIG. 2). Pressure sensor 13 is powered via power supply 14, and produces an output pressure signal representative of the dynamic water pressure which is sensed within the jet intake chamber 3 of personal watercraft 1. Pressure sensor 13 is an absolute pressure sensor, rather than a differential gauge sensor, which facilitates incorporation of the sensor within an airtight, waterproof enclosure, as is necessary, given the manner and environment in which a personal watercraft is generally operated. It is conceivable that a differential gauge sensor could also be used, so long as means is provided for venting the differential port of the sensor to atmospheric conditions.

As stated above, pressure sensor 13 produces an output pressure signal representative of the dynamic water pressure within intake chamber 3. The pressure signal from pressure sensor 13 is an analog voltage signal which changes in amplitude with pressure variances. Such pressure signal is transmitted from the pressure sensor 13 through amplification circuitry 15 into an analog-to-digital conversion circuit 16 to produce a digital output signal which can be processed further for calculating the true speed of watercraft 1, via the use of microprocessor 17. In general, microprocessor 17 converts the pressure signals generated from pressure sensors 13 into actual or true speed readings for the personal watercraft 1. Such speed readings are then disclosed to the operator of the personal watercraft 1 through a display means 18, as shown generally in FIG. 2.

Figure 3:
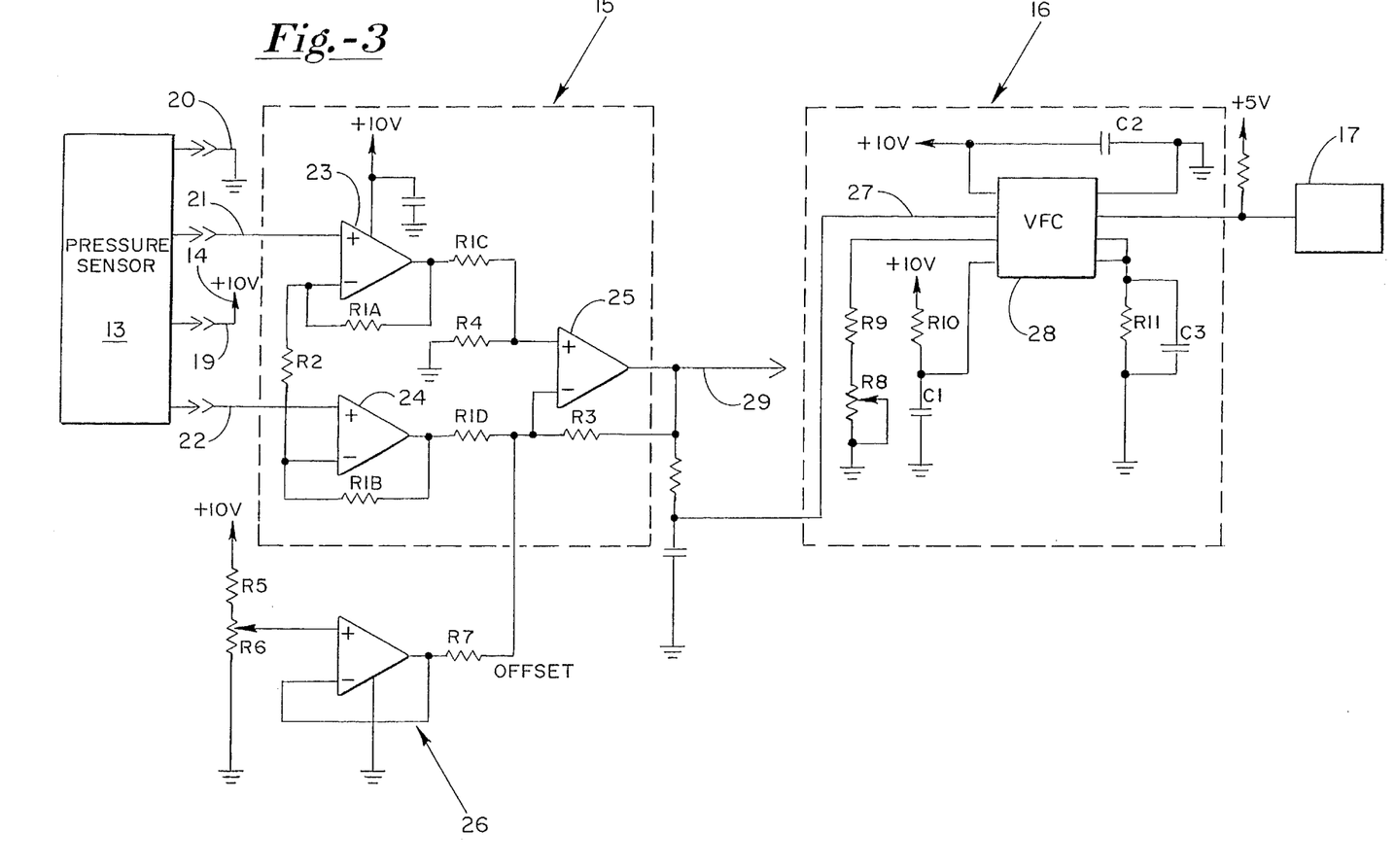
FIG. 3 shows an electrical schematic of the pressure signal processing circuitry leading to the microprocessor.

More specifically, as shown in FIG. 3, pressure sensor 13 is supplied with power from a ten-volt power supply 14 via line 19, and is grounded at line 20. The dynamic water pressure generated within the jet intake chamber 3 of the personal watercraft 1 creates a static pressure within tubing 12 that is sensed by pressure sensor 13, thereby creating a potential difference or voltage between output lines 21 and 22 of sensor 13.

The voltage created between output lines 21 and 22 of pressure sensor 13 is input to amplification circuitry 15 which constitutes an instrumentation amplifier composed primarily of operational difference amplifiers 23, 24, 25 and resistive network R1A, R1B, R1C, R1D, R2 and R3. Such resistive components are set at predetermined values to establish the desired gain of the instrumentation amplifier 15. In the preferred embodiment shown in FIG. 3, such resistors have been chosen to produce an overall gain of about 396. Resistor R4 is appropriately set for controlling biasing currents of instrumentation amplifier 15. A typical instrumentation amplifier, such as that manufactured by National Semiconductor Corporation, Santa Clara, Calif., Model Number LM324, may be used to provide the desired amplification. Of course, other instrumentation amplifiers may work equally as well.

Because pressure sensor 13 has been chosen in the preferred embodiment to be an absolute pressure sensor, rather than a differential gauge sensor, the effects of atmospheric pressure cause an undesirable biasing voltage across input lines 21 and 22 to the instrumentation amplifier 15. For a pressure sensor 13 of the type chosen in the preferred embodiment, which outputs 40 millivolts per 100 pounds/square inch (psi) water pressure, the effects of atmospheric pressure alone can cause an output signal from the instrumentation amplifier in excess of 2 volts. To offset a major portion of the effects of atmospheric pressure, an offset voltage from offset circuitry 26 is introduced to amplification circuit 15 at the negative terminal of operational amplifier 25, thereby compensating for the effects of the voltage generated as a result of atmospheric pressure. Resistors R5, R6 and R7 are set such that only a residual voltage of about 0.6 volts resulting from atmospheric pressure will remain at the output 29 of amplification circuit 15.

The amplified analog pressure signal from output 29 of instrumentation amplifier 15 is input to the analog-to-digital conversion circuitry 16 along line 27. The analog-to-digital converter 16, as used in the preferred embodiment, converts the amplified analog pressure signal from pressure sensor 13 to a digital pulsetrain, the frequency of which increases and decreases in direct proportion with changes in the amplitude of the inputted analog pressure signal. The output of the analog-to-digital converter 16, therefore, comprises a digital pulsetrain, the frequency of which is representative of the dynamic water pressure which is sensed within the jet intake chamber 3 of the personal watercraft 1.

As shown in FIG. 3, the analog-to-digital conversion circuitry 16 is comprised of a voltage-to-frequency converter 28, similar to that manufactured by Exar Corporation, San Jose, Calif., Model Number XR4151. Resistors R8, R9, R10, R11, and capacitors C1, C2 and C3 are connected to the voltage frequency converter 28, and selected appropriately in accordance with the specifications for converter 28, so as to cause the desired conversion ratio between the analog input voltage and output frequency of the converter 28. In the preferred embodiment, such components have been selected such that an analog input voltage of 1 volt will produce an output digital pulsetrain having a frequency of 1 kilohertz. Of course, other voltage-to-frequency ratios may be obtained by simply changing the value of the components selected.

The digital output pulsetrain from the analog-to-digital conversion circuitry 16 is input into microprocessor 17, where the digital pulsetrain is continually sampled and processed to convert the pressure-representative pulsetrain to a measurement of the actual or true speed of the personal watercraft 1. The microprocessor 17 utilizes a variable time-gating algorithm which samples high frequency pressure signals at a much faster rate than low frequency pressure signals. Sampling the pressure signal frequency at variable rates, depending upon the amplitude of the pressure signal transmitted from the water intake chamber 3, allows for the use of a smaller, less expensive counter for counting the number of pulses in each sampling period. To equate the sampled pulse count to the actual pressure signal frequency, the sampled pulse count is multiplied by an appropriate factor to complete a full sampling period equivalent to that used at low pressure signals.

The use of the voltage-to-frequency converter 28 for converting the analog pressure signal to a digital signal also provides the advantage of self-averaging or self-integrating the calculated true speed of the personal watercraft 1. By way of example, over a sampling period of 0.5 seconds, the frequency of the pressure signal may vary in response to variances in the dynamic water pressure within the jet intake chamber 3. This creates a non-uniform pulsetrain over the full sampling period. By counting the number of pulses within the 0.5 second sampling period, the actual or true speed of the personal watercraft 1, calculated over such sampling period, will effectively be an average of the speed variance over such period.

It is generally known from Bernoulli's equation that the dynamic water pressure in a pitot tube rises proportionately to the square of water flow velocity. However, this relationship between pressure and flow velocity neglects the effects of turbulence and other variables which introduce significant non-linearities in measurements of dynamic water pressure. Such non-linearities can cause an undesirable and significant disparity between theoretical and actual results. It is for this reason that it has not heretofore been considered feasible to measure speed of a watercraft through measurement of the dynamic water pressure within a jet intake chamber, as the water flow therethrough is extremely turbulent and non-linear in characteristic, making it impractical, if not impossible, to accurately measure the true speed of a watercraft as a function of the dynamic water pressure within the jet intake chamber.

It has been found, however, that through the application and use of a piecewise linear scaling approximation, the actual or true speed of a jet-propelled watercraft may be accurately determined to within +/−0.5 mph, with a display resolution of 0.1 mph from speeds of 0 to 65 mph. As stated above, the microprocessor continually samples the output pulsetrain from the analog-to-digital conversion circuitry 16 and counts the pulses within a variable sampling period, depending upon the level of the pressure signal which is sensed. The average frequency over the sampling period is then determined and used in the calculation of the actual or true speed of the jet-propelled watercraft through application of the following equation:

$$S=SQRT[X^*(F-Z)]$$

where F is the frequency output of the analog-to-digital converter which is representative of the dynamic water pressure sensed within the jet intake chamber; Z, which is discussed in more detail below, represents a variable offset to account for both additional pressure as a result of the position (depth) of the pitot tube within the water, and bias offsets of the pressure sensor 13 as a result of temperature and atmospheric pressure; X represents the variable linear scaling factor which is utilized to make application of the piecewise linear scaling approximation to account for the non-linearities which are present in the dynamic water pressure within the jet intake chamber 3; and S is the approximate true speed at which the watercraft is traveling. The term SQRT means the square root of the value contained within the brackets following such term.

To apply the above piece-wise linear approximation, for a given jet-propelled watercraft, the full range of pressure signal levels corresponding to the full range of true speed measurements for the personal watercraft 1 is determined empirically and subdivided into a plurality of predetermined smaller ranges of pressure. With such empirical data, the appropriate linear scaling factor (X) may then be determined and applied to each predetermined range of pressure signal levels to scale the same such that an accurate approximation of the true speed of the watercraft may be obtained upon application of the above formula. For each predetermined range of pressure signal levels, the linear scaling factor may vary to accommodate for and approximate the non-linearities which are introduced in the dynamic water pressure within the jet intake chamber 3 of watercraft 1. By applying the above process, a piecewise linear approximation of a substantially non-linear function may be effected, thereby providing for the accurate calculation of the true speed of watercraft 1 as a function of the substantially non-linear dynamic water pressure present within its jet intake chamber 3.

It should be noted that the linear scaling factors used in the above piecewise linear approximation may be different for differently designed jet-propelled watercraft. However, the basic approach of applying a piecewise linear approximation to approximate a substantially non-linear function between the true speed of a jet-propelled watercraft 1 and the dynamic water pressure within its jet intake chamber 3 will remain valid, and has broad applications in all jet driven watercraft. As stated previously, the accuracy capable of being obtained through application of the above process has been found to be a +/−0.5 mph with a display resolution of 0.1 mph from 0 to 65 mph.

With reference to the variable offset (Z) in the above equation, it is first noted that, at initial start-up or power-down of a jet-propelled watercraft, the watercraft is generally resting at a still condition, and an accurate speedometer should reflect this condition by displaying a zero speed reading. Because a highly accurate electronic absolute pressure sensor is used in the preferred embodiment, residual static pressures are present which affect the absolute pressure sensor 13 to cause undesirable biasing thereof, resulting in small but significant pressure signals being transmitted to the microprocessor 17. If not compensated for, such pressure signals will display an erroneous speed reading at still conditions, and will affect the calculation of the true speed of the jet-propelled watercraft.

As discussed previously, a major portion of the effect of atmospheric pressure is offset via offset circuitry 26, which is connected to instrumentation amplifier 15. Since the instrumentation amplifier 15 is operated with a 10-volt supply, and its maximum output is less than 10 volts, if atmospheric pressure at this point in the circuit is not accounted for, over 20 percent of the usable range of voltage output for determining speed is wasted. Thus, through calibration of offset circuitry 26, a major portion of the effect of atmospheric pressure is accounted for, leaving only a residual output voltage of approximately 0.6 volts from instrumentation amplifier 15.

In order to account for the remaining effect of atmospheric pressure, temperature effects on pressure sensor 13, and additional pressure introduced from the change in depth of the pitot tube within the water when an operator mounts a personal watercraft, microprocessor 17 includes an auto zero tracking mechanism. The auto zero tracking mechanism provides a numerical offset representative of these residual pressures to automatically zero the speed reading of the jet-propelled watercraft upon initial start-up or power-down of the watercraft 1, and during such times when the speed measuring system is turned on and the watercraft engine is off.

This numerical offset also effectively removes such static biasing conditions when calculating the true watercraft speed during operation thereof. As shown in the above formula for calculating true speed of the jet-propelled watercraft 1, the auto zero tracking mechanism determines a value (Z) at initial start-up, which is used to offset the sensed pressure frequency level (F) during operation of the watercraft. For reasons described in more detail hereinbelow, a new value for Z is also determined at power-down, and is continually tracked thereafter for a period of about five (5) minutes, at which time the speed measuring system automatically turns off.

Figure 4A:
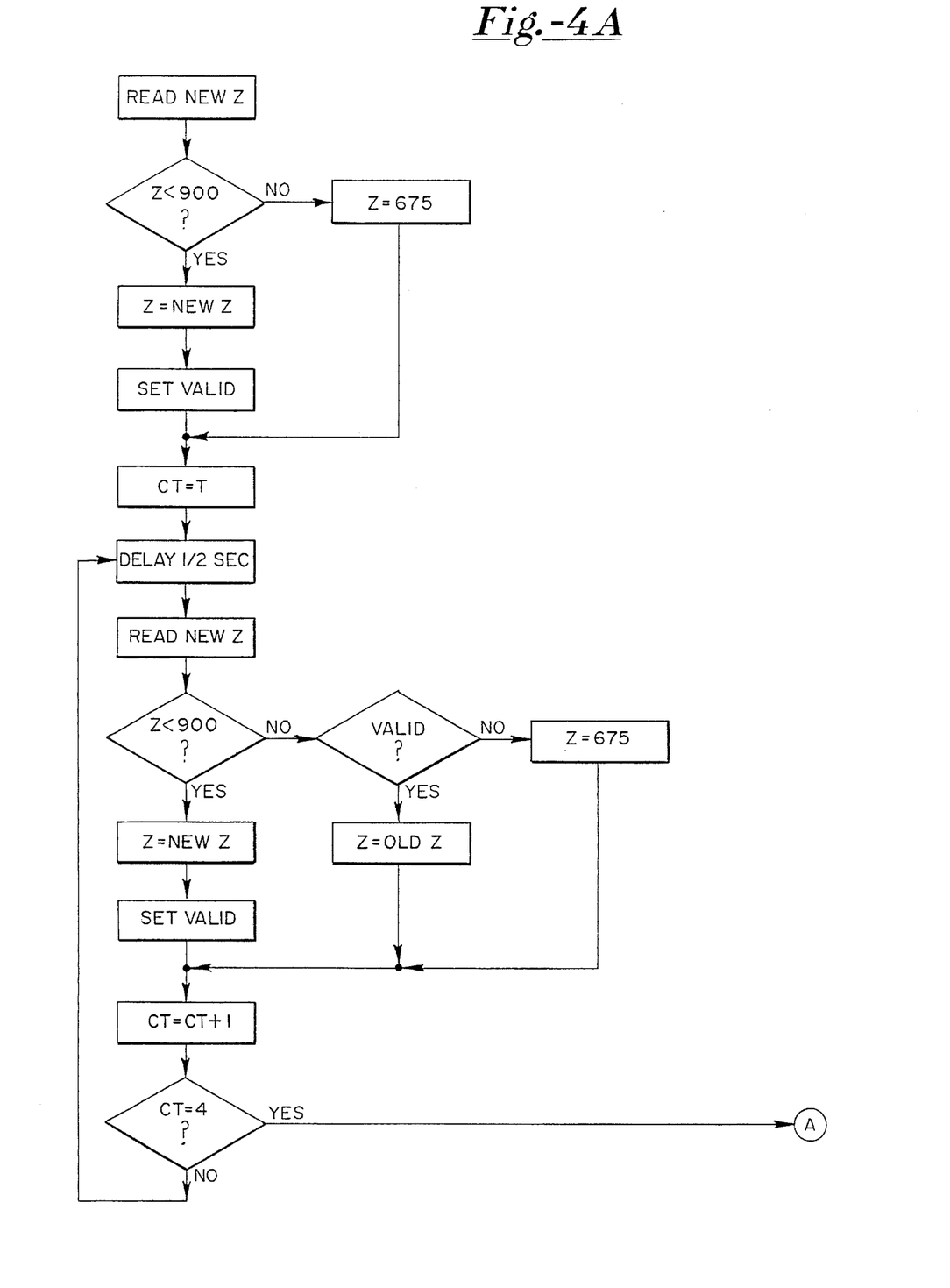
FIG. 4A is a flow chart showing my auto zero tracking system for defining a zero speed base pressure corresponding with pressure conditions existing at start-up of the watercraft.

As shown in FIG. 4A, upon initial start-up of the jet-propelled watercraft 1, or by simply turning the speed measuring system on without starting the watercraft engine, the microprocessor 17 samples the pressure signal output from the voltage-to-frequency converter 28 (designated "Z") and determines whether the level of such pressure signal exceeds 900 Hertz. Since it has been determined that, under normal operating conditions, the residual static water pressure existing within the water intake chamber 3 should not exceed 900 Hertz, any pressure signal found to be below 900 Hertz will automatically be set as a zero offset pressure signal (Z) in the above equation. If the initial sampling of the water pressure signal proves to be greater than 900 Hertz, the zero offset defaults to 675 Hertz. Certainly, if conditions were such that the residual static pressure were consistently higher than 900 Hertz, such value could be adjusted accordingly.

As can be seen in FIG. 4A, this process is repeated four times initially to insure that the zero offset at initial start-up is accurately determined. If the speed measuring system is turned on, but the watercraft engine remains off, the auto zero tracking system continues to track inputted pressure signals from the jet intake chamber 3 (see FIG. 4B), and adjusts the zero offset (Z) as necessary to meet the changing conditions in water pressure due to variances in temperature, atmospheric pressure and/or the depth of the pitot tube within the water. The auto zero tracking system continues to track such slow varying conditions until such time that the microprocessor 17 senses start-up of the watercraft engine, or the speed measuring systems is shut down.

Figure 4B:
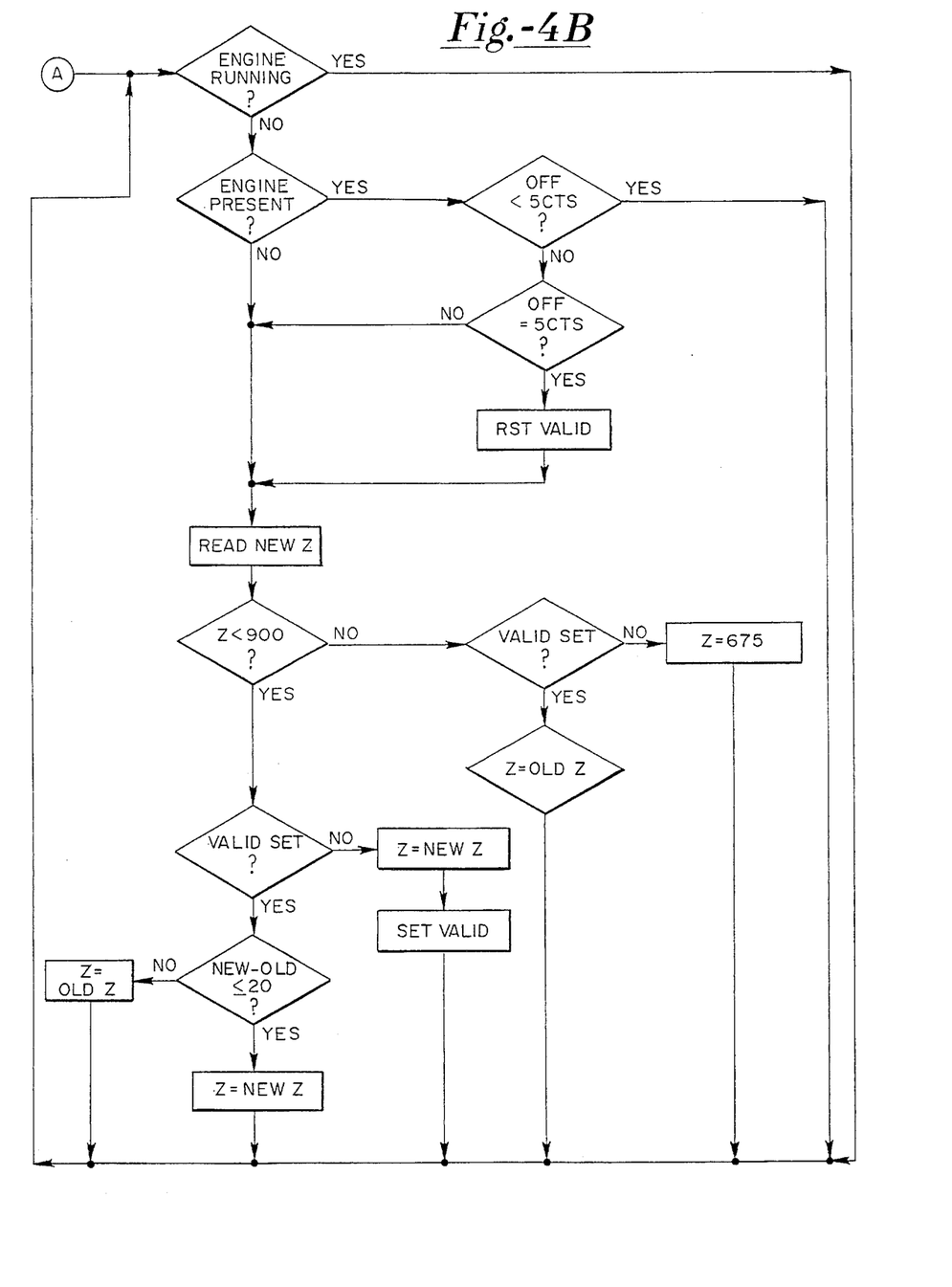
FIG. 4B is a flow chart showing my auto zero tracking system for defining a zero speed base pressure corresponding with pressure conditions existing at power-down of the watercraft and thereafter.

As shown in FIG. 4B, once initial start-up of the watercraft engine is complete, the auto zero tracking mechanism continually monitors the status of the engine to determine whether it is running, or whether power-down has occurred. So long as it is determined that the engine is running, the zero offset is not altered, and the auto zero tracking mechanism is effectively disabled from determining a new offset. However, upon occurrence of power-down, the microprocessor 17 detects a status change in the engine and again begins the process of determining a new zero offset based upon conditions existing at power-down.

It is important to note that my new speed measuring system for jet-propelled watercraft is designed to remain on and continue displaying the watercraft's speed for approximately five (5) minutes after power-down has occurred. Therefore, it is important to determine a new zero offset at power-down such that the display will properly read 0 mph at still conditions after power-down. During the time when the speed measuring system remains in the on condition after power-down, it continually samples the pressure signal output from the voltage frequency converter 28 and determines new zero offset values in accordance with changing conditions in temperature, etc., after power-down.

Also included in my new speed measuring system for jet-propelled watercraft is a drop-out signal processing means which provides for speed interpolation during periods when the watercraft, and consequently the pitot tube, breaks contact with the water. When utilizing an electronic pressure sensor and digital signal processing to determine the speed of a watercraft, the accuracy and speed at which such processing is accomplished can cause erratically fluctuating speed readings due to "drop-outs" in the pressure readings, if no correction is made therefor. This problem is particularly more prominent with the use of personal watercrafts, which frequently skip along the water at high speeds, and often break contact with the water due to their small physical size.

To compensate for drop-outs in pressure readings, the microprocessor 17 of my speed measuring system samples and identifies pressure signal drop-outs, and characterizes and digitally treats such drop-outs as missing data. Through interpolation, the microprocessor 17 averages data obtained from the previous two samples, and substitutes such data for the drop-out readings in the computation of the true speed of the watercraft. By so doing, the display of the speed to the operator does not fluctuate erratically during drop-out conditions, and provides a uniform and accurate measure of the actual or true speed at which the watercraft is traveling.

Although not as accurate as an electronic system for determining true speed of a jet-propelled watercraft 1 as a function of the dynamic water pressure within the jet intake chamber, it is contemplated that a mechanical pressure speedometer could be calibrated to provide the necessary graduations in the speed display to correlate with the pressure measured within the jet intake chamber 3. However, such a system is less accurate, suffers severely from pressure fluctuations (drop-out), and is heavily dependent upon water conditions. As such, it is deemed to be far more desirable to incorporate digital signal processing techniques to accurately and uniformly determine the true speed of a-jet-propelled watercraft as a function of the dynamic water pressure within its jet intake chamber.

It will, of course, be understood that various changes may be made in the form, details, arrangement and proportions of the parts without departing from the scope of the invention which comprises the matter shown and described herein and set forth in the appended claims.

I claim:

1. A speed measuring system for a jet propelled watercraft, comprising:

a. a jet propelled watercraft having a jet intake chamber through which water is drawn to propel said watercraft;

b. a fluid pressure sensing device mounted within said jet intake chamber and positioned to protrude outwardly into said chamber in substantially unobstructed clean flow relation to said water flowing therethrough, said fluid pressure sensing device producing a pressure signal representative of the dynamic water pressure within said jet intake chamber;

c. a speed indicating apparatus connected to said fluid pressure sensing device for determining the actual speed of said watercraft, said speed indicating apparatus comprising:

1) a speed computing means for computing the actual speed of said watercraft as a function of said pressure signal, said computing means including a pressure compensation means for scaling said pressure signal to compensate for non-linear variances introduced in the dynamic water pressure within said intake chamber or a result of accelerated turbulent waterflow therethrough and the geometry of said intake chamber; and 2) speed disclosure mechanism connected to said computing means for signaling to the watercraft operator the actual speed of said watercraft.

2. The structure defined in claim 1, wherein an impeller drive shaft carrying an impeller extends within said jet intake chamber, said fluid pressure sensing device being disposed below said drive shaft and forward of said impeller.

3. The structure defined in claim 2, wherein said intake chamber has a forward wall and a forwardly disposed intake opening, said fluid pressure sensing device being mounted on said forward wall adjacent said opening.

4. The structure defined in claim 1, wherein said intake chamber has a forward wall and a forwardly disposed intake opening, said fluid pressure sensing device being mounted on said forward wall adjacent said opening.

5. The structure defined in claim 1, wherein said fluid pressure sensing device is comprised of a pitot tube mounted within said intake chamber which is connected to an electronic pressure sensor.

6. The structure defined in claim 1, wherein said speed indicating apparatus includes a signal processing means for converting said pressure signal from an analog input signal to a digital output pulsetrain, the frequency of which varies proportionately to increases and decreases in the amplitude of said pressure signal.

7. The structure defined in claim 1, wherein said pressure compensation means includes a variable scaling means which applies a linear scaling factor to said pressure signal, said scaling factor varying for different predetermined ranges of pressure signals to compensate for non-linear water pressure variances within said intake chamber.

8. The structure defined in claim 1, wherein said speed indicating means includes a pressure signal drop-out tracking mechanism which continuously samples said pressure signal, and detects and ignores pressure signal drop-outs, said tracking means substituting therefor an interpolated pressure signal which is transmitted to said speed computing means, said interpolated pressure signal being comprised of an average of previously sampled pressure signals.

9. The structure defined in claim 1, wherein said speed indicating apparatus includes a zero speed calibration mechanism which samples said pressure signal at least once upon initial start-up of said jet propelled watercraft, thereby defining a zero-speed base pressure corresponding to zero speed still conditions of said watercraft at start-up.

10. The structure defined in claim 9, wherein said zero speed calibration mechanism is constructed and arranged to sample said pressure signal at least once upon power-down of said jet propelled watercraft, thereby redefining said zero-speed base pressure to correspond to the pressure conditions existing at power-down of said watercraft.

11. The structure defined in claim 10, including means for disabling said zero speed calibration mechanism between such time that said zero-speed base pressure is defined at initial start-up of said watercraft and such time that said zero-speed base pressure is redefined at power-down of said watercraft.

12. A speed measuring system for a jet propelled watercraft, comprising:
   a. a jet propelled watercraft having a jet intake chamber with a forward end and a jet intake opening through which water is drawn to propel said watercraft;
   b. a fluid pressure sensing device mounted within said jet intake chamber adjacent said forward end and adjacent said intake opening, said sensing device protruding outwardly into said chamber in substantially unobstructed clean flow relation to said water flowing therethrough, said fluid pressure sensing device producing a pressure signal representative of the dynamic water pressure within said jet intake chamber;
   c. a speed gauging apparatus connected to said fluid pressure sensing device for determining the actual speed of said watercraft, said speed gauging apparatus including;
      1) a speed computing means for computing the actual speed of said watercraft as a function of said pressure signal, said computing means including a pressure compensation means which applies a linear scaling factor to said pressure signal for a predetermined range of said pressure signals, said linear scaling factor varying for different predetermined ranges of said pressure signals to compensate for non-linear variances introduced in the dynamic water pressure within said jet intake chamber;
      2) a pressure signal drop-out tracking mechanism for detecting and ignoring pressure signal drop-outs, and transmitting a substitute interpolated pressure signal to said speed computing means which is determined from prior valid pressure signals; and
      3) speed display mechanism connected to said computing means for signaling to the watercraft operator the actual speed of said watercraft.

13. The structure defined in claim 12, wherein said speed gauging apparatus includes a signal processing means for converting said pressure signal from an analog input signal to a digital output pulsetrain, the frequency of which varies proportionately to increases and decreases in said pressure signal.

14. The structure defined in claim 12, wherein said speed engaging apparatus includes a zero-speed calibration mechanism which samples said pressure signal at least once upon initial start-up of said jet propelled watercraft, thereby defining a zero-speed base pressure corresponding to zero-speed still conditions of said watercraft at start-up.

15. The structure defined in claim 12, wherein said speed indicating apparatus includes a zero-speed calibration mechanism which samples said pressure signal at least once upon initial start-up and power-down of said jet propelled watercraft, thereby continually defining a new zero-speed base pressure at start-up and power-down of said watercraft, which corresponds to the zero-speed conditions of said watercraft at such times.

16. The structure defined in claim 12, wherein said speed computing means utilizes the formula $S=SQRT[X^*(F-Z)]$, where F represents said pressure signal expressed in units of frequency, Z represents a variable pressure offset expressed in units of frequency which accounts for static biasing conditions of said fluid pressure sensor, X represents said linear scaling factor which is applied to said pressure signal at varying levels over said different predetermined ranges of said pressure signals, and S represents the actual speed of said watercraft.

17. A method of determining the actual speed of a jet propelled watercraft as a function of the dynamic water pressure generated within a jet intake chamber of such a watercraft, comprising the steps of:
   a. providing a jet propelled watercraft having a jet intake chamber through which water is drawn to propel said watercraft;
   b. mounting a fluid pressure sensor within said jet intake of said watercraft in such position as to protrude outwardly into said chamber in substantially unobstructed clean flow relation to said water flowing therethrough, said fluid pressure sensor producing a pressure signal representative of the dynamic water pressure within said jet intake chamber;
   c. sensing said pressure signal provided by said fluid pressure sensor and scaling said pressure signal appropriately to compensate for non-linear variances introduced in the dynamic water pressure within said intake chamber, thereby defining a scaled water pressure signal;
   d. computing the actual speed of said watercraft as a function of said scaled water pressure signal; and
   e. disclosing said computed actual watercraft speed to the operator of said watercraft.

18. The method defined in claim 17, including the step of determining a zero-speed base pressure upon initial start-up of said jet propelled watercraft which corresponds to zero-speed still conditions of said watercraft at start-up, and subtracting said zero-speed base pressure from said pressure signal prior to applying said scaling factor thereto.

19. The method defined in claim 17, including the step of monitoring said pressure signal generated by said fluid pressure sensor, detecting pressure signal drop-outs in said pressure signal, and substituting for said pressure signal drop-outs an interpolated pressure signal which is derived from an average of prior said pressure signals.

20. The method defined in claim 17, wherein said step of sensing and scaling said pressure signal for computation of the actual speed of said watercraft includes the application of a linear scaling factor to said pressure signal over a predetermined range of said pressure signals, said linear scaling factor being varied for different predetermined ranges of said pressure signals to compensate for non-linear variances introduced in the dynamic water pressure within said jet intake chamber.

21. The method defined in claim 17, including the step of converting said pressure signal from an analog signal to a digital pulsetrain, the frequency of which varies proportionately to increases and decreases in the amplitude of said pressure signal.

* * * * *